United States Patent Office 3,485,219
Patented Dec. 23, 1969

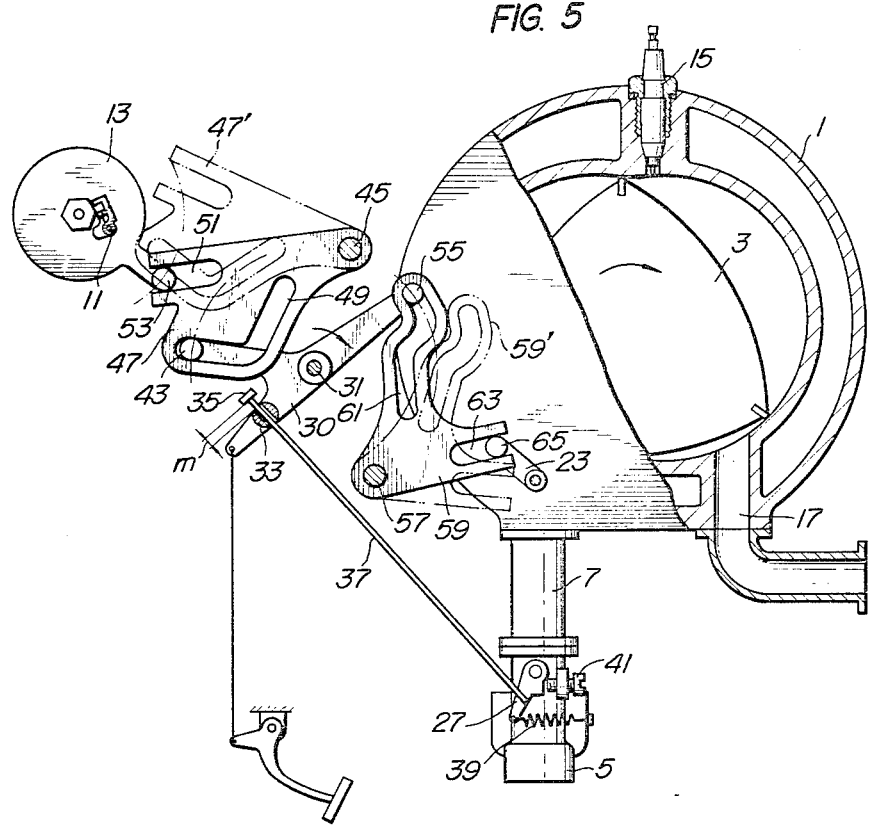

3,485,219
CONTROL DEVICE FOR ROTARY PISTON ENGINE
Yoshitsugu Hamada, Teruhiro Imai, Yukio Maeda, and Kimitaka Tsuchii, Nagahama-shi, Japan, assignors to Yanmar Diesel Engine Co., Ltd., Osaka, Japan, a corporation of Japan
Filed Dec. 12, 1967, Ser. No. 689,902
Claims priority, application Japan, Mar. 25, 1967, 42/24,596
Int. Cl. F02b 53/06; F02d 37/02
U.S. Cl. 123—8   3 Claims

ABSTRACT OF THE DISCLOSURE

A device for controlling a rotary piston engine in which a throttle valve provided in the vicinity of a suction port, an ignition system and a throttle valve in the carburetor have their respective operating levers connected with each other through an acceleration lever and a link, whereby said throttle valve for the suction portion, ignition system and throttle valve in the carburetor are operated correlatively with each other so as to avoid misfire of the engine during operation at low r.p.m. and to draw a large output during operation at high r.p.m.

BACKGROUND OF THE INVENTION

Field of the invention

The present invention relates to a control device for a spark ignition-type rotary piston engine comprising a central housing, side covers to close both sides of said central housing, a rotary shaft extending through the center of said housing and side covers, and a rotor mounted on said rotary shaft for rotation within the housing and provided at each apex with a sealing member which slides on the inner surface of said housing.

Description of the prior art

In the operation of a rotary piston engine of the type described, there is usually a period in which the suction port for sucking a mixed gas into the engine and the exhaust port for exhausting the combustion gas to the outside of the engine, are in communication with each other. Such a period is provided primarily for the purpose of obtaining a large output during operation of the engine at high r.p.m. On the other hand, when the opening of the carburetor throttle valve is reduced during operation of the engine at low r.p.m. or for reducing the r.p.m. sharply, the negative pressure in the suction tube becomes so large that the combustion gas to be exhausted from the engine flows back into the suction tube during the aforesaid period, diluting the mixed gas being sucked into the engine, and thus misfire of the engine occurs.

SUMMARY OF THE INVENTION

The object of the present invention is to prevent the misfire of a rotary piston engine during operation at low r.p.m. as well as to obtain a large output of the engine during operation at high r.p.m., by providing a throttle valve in the vicinity of the suction port and connecting said throttle valve and a variable timing ignition system with the carburetor throttle valve respectively.

BRIEF DESCRIPTION OF THE DRAWINGS

FIGS. 5 and 6 respectively are views showing embodiments of the present invention.

DESCRIPTION OF THE PREFERRED EMBODIMENTS

The control device of the present invention will be more clearly understood from the following description when taken in conjunction with the accompanying drawings.

Figure 1:
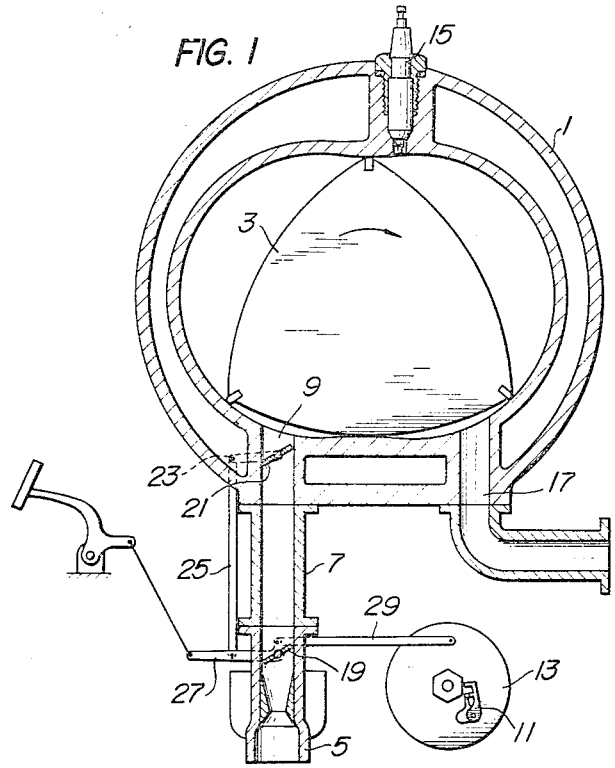
FIG. 1 is a cross section of a rotary piston engine which is provided with the control device of the present invention.

Referring first to FIG. 1, there is shown a rotary piston engine in which the four strokes of the engine consisting of suction, compression, expansion and exhaust, are accomplished by the rotation of a rotor 3 mounted in a central housing 1. During the suction stroke, a mixed gas formed in a carburetor 5 is sucked into the housing through a suction tube 7 and a suction port 9. The mixed gas is compressed during the compression stroke and the compressed mixed gas is burnt, during the first half of the expansion stroke, upon ignition by an ignition system comprising a contact breaker 11, a mounting base 13 for said contact breaker and an ignition plug 15. In the exhaust stroke, the resultant combustion gas is exhausted to the outside of the engine through an exhaust port 17 in said housing. The engine output is usually controlled by opening and closing a carburetor throttle valve 19.

Figure 2:
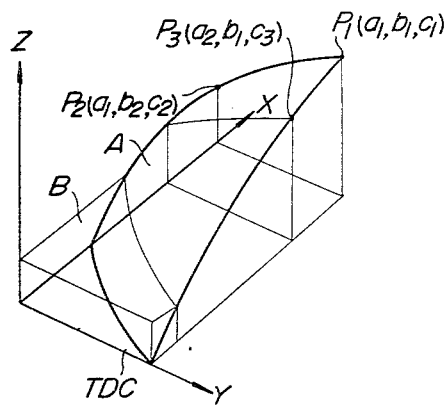
FIGS. 2 and 3 respectively are diagrams illustrating the characteristics of the engine.

FIG. 2 shows a diagram which illustrates the relationships between the pressure within the suction tube, and the opening area of the suction port and the ignition timing, when the engine is operated at a constant low r.p.m. with the carburetor throttle valve closed substantially completely. This diagram has been obtained from the actual operation of an engine and the area of the suction port opening is indicated along the X-axis, ignition timing along the Y-axis (the arrow shows the direction of ignition point advance and TDC shows the point of top dead center), and the absolute value of negative pressure within the suction tube is indicated along the Z-axis.

From the diagram, it will be seen that the negative pressure within the suction tube shows a characteristic which is represented by a curved surface A. Namely, when the suction port opening is constant, e.g. $X=a_1$, the value of negative pressure Z becomes smaller, e.g. from $c_1$ to $c_2$, as the ignition timing Y is delayed, e.g. from $b_1$ to $b_2$. On the other hand, when the ignition timing is constant, e.g. $Y=b_1$, the value of negative pressure Z also becomes smaller, e.g. from $c_1$ to $c_3$, as the suction port opening X is reduced, e.g. from $a_1$ to $a_2$. As can be seen from the above, a reduction within value of the negative pressure in the suction tube signifies a tendency of the degree of dilution with the exhaust of the mixed gas in the suction tube being lowered, and it has been found that no misfire of the engine will in fact occur when the negative pressure is smaller than a certain value, e.g. a value in or below a plane B. In other words, misfire of the engine during operation at a low r.p.m., with a small opening of the carburetor throttle valve, can be avoided by delaying the ignition timing beyond a certain point (usually beyond the top dead center) and reducing the suction port opening below a certain degree.

Figure 3:
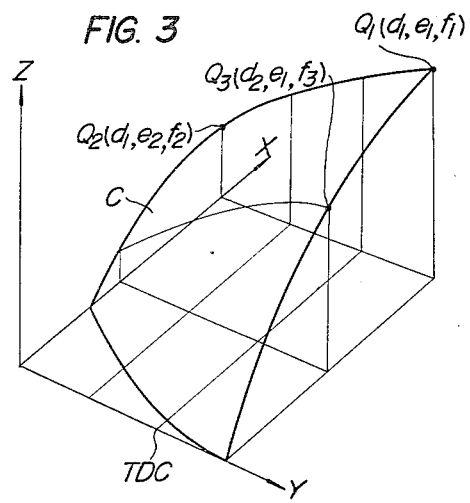

FIG. 3 shows a diagram which illustrates the relationships between the output of the engine, and the area of the suction port opening and ignition timing, when the engine is operated at a constant high r.p.m. with the carburetor throttle valve of a carburetor fully opened. In this diagram, which has also been obtained from the actual operation of a engine, the area of the suction port opening is indicated along the X-axis, ignition timing along the Y-axis, and engine output along the Z-axis. The engine output shows a characteristic which is represented by a curved surface C. Namely, when the opening of the suction port is constant, e.g. $X=d_1$, the engine output Z increases, e.g. from $f_2$ to $f_1$, as the ignition point Y advances, e.g. from $e_2$ to $e_1$, whereas, when the ignition timing is constant, e.g. $Y=e_1$, the engine output Z also increases, e.g. from $f_3$ to $f_1$, as the area of the suction port opening X becomes larger, e.g. from $d_2$ to $d_1$. In other words, in order to obtain a large output during operation at a high r.p.m., with the throttle valve of the carburetor fully opened, it is necessary to advance the ignition point (usually to a point ahead of top dead center) and increase the degree of the suction port opening.

In view of the above, it is proposed to vary the degree of opening of the throttle valve of the carburetor, the degree of the suction port opening and the ignition timing, correlatively with each other, for the purpose of obtaining a smooth operation of the engine at low r.p.m. and a large output at high r.p.m.

Referring again to FIG. 1, it will be seen that a throttle valve 21 is provided in the vicinity of the suction port 9 and the operating lever 23 of said throttle valve is connected to the operating lever 27 of the throttle valve 19 of the carburetor through a link 25. On the other hand, the mounting base 13 of the contact breaker, which is adapted to vary the ignition timing upon revolution, is also operatively connected to the carburetor throttle valve operating lever 27 through a link 29.

When the throttle valve 19 of the carburetor is operated, with the arrangement described, the throttle valve 21 and the interrupter mounting base 13 are operated by way of the respective links 25 and 29, whereby the suction port opening and the ignition timing are suitably varied.

Figure 4:
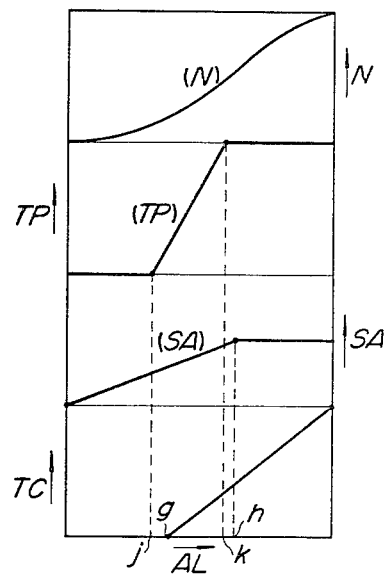
FIG. 4 is a chart illustrating the operational conditions to be brought about by the control device of this invention.

Referring to FIG. 4, which is a chart illustrating the relationships between the degree of opening of the throttle valve TC of the carburetor, angle of advance SA of the degree of opening of the suction port throttle valve TP and engine r.p.m. N, and the angle of an acceleration lever AL, the former four variables being indicated along the coordinate and the later along the abscisa. These relationships have been established by the actual acceleration and deceleration of an engine under a propeller load and thereby a smooth operation of the engine is possible.

From the chart it will be understood that, when the angle of acceleration lever AL is increased progressively, the degree of the opening of the throttle valve TC of the carburetor remains unchanged within the range wherein said angle is relatively small, and begins to change once the angle reaches a value $g$. Thereafter, the degree of opening changes with the increase of said angle of the acceleration lever until the throttle valve is opened completely. On the other hand, the ignition point SA advances immediately after the angle of acceleration lever increases and advances fully when said angle reaches a value $h$. Thereafter, the ignition point is maintained at a constant angle irrespective of the advance of the acceleration lever.

The degree of suction port opening of the throttle valve TP is not changed at all within the range wherein the angle of acceleration lever is smaller than a value $j$, but becomes greater with the angle of acceleration lever within a range from $j$ to $k$ and is held fully open after said angle has reached the value $k$ irrespective of said angle.

A preferred embodiment of the mechanism which is capable of correlating the degree of opening of the throttle valve of the carburetor, advance angle of the ignition point and the degree of suction port opening of the throttle valve with the rotational angle of the acceleration lever as in the chart of FIG. 4, is shown in FIG. 5. In this figure, reference numeral 30 designates the acceleration lever mounted on a pivot pin 31 for pivotal movement thereabout. The acceleration lever 30 carries thereon a stud 33 having a hole bored therethrough, and a link 37 having a head 35 is extending through said hole with the end remote from the head 35 connected to the carburetor throttle valve operating lever 27 of the carburetor. The link 37 is not movable, permitting the stud 33 to slide thereon, unless the stud 33 is brough into abutment against the head 35 thereof. The throttle valve operating lever 27 is biased in the closing direction of the valve by a spring 39. The minimum opening of the throttle valve is set by a set screw 41. With the arrangement described, when the rotational angle of the acceleration lever 30 is zero, which is the idling state of the engine, the head 35 of the link 37 is spaced a predetermined distance $m$ from the stud 33. Upon rotation of the acceleration lever 30 in the direction of the arrow, the stud 33 approaches the head 35 but the operating lever 27 of the throttle valve of the carburetor will not be actuated until the stud 33 abuts against the head 35 of the link 37. However, once the stud 33 has been brought into abutment against the head 35 of the link, the throttle valve operating lever 27 of the carburetor is rotated by the link 37 as the acceleration lever 30 rotates and thus the opening of the throttle valve is increased.

A second stud 43 also is mounted on the acceleration lever 30. This stud 43 is in engagement with a cam groove 49 in a cam plate 47 which is mounted on a pivot pin 45 for pivotal movement thereabout. The cam plate 47 has a portion thereof forked to form a notch 51, in which a stud 53 mounted on the mounting base 13 of the contact breaker 11 is slidably received. Because of such arrangement, when the acceleration lever 30 is rotated in the direction of the arrow, the cam plate 47 is caused to rotate about the pivot pin 45 by the action of the stud 43 and finally reaches the position indicated at 47'. Upon reaching this position, the cam plate will not be rotated by the acceleration lever 30 even when said lever continues its rotation in the direction of the arrow, because in this position of the cam plate the stud slides only in the cam groove 49. During rotation of the cam plate 47, the stud 53 on the mounting base 13 of the contact breaker is moved by the notch 51 in the cam plate, whereby the mounting base is rotated and the ignition point advances accordingly.

Furthermore, a third stud 55 is mounted on the acceleration lever 30. This stud 55 is in engagement with a cam groove 61 formed in a cam plate 59 which is mounted on a pivot pin 57 for pivotal movement thereabout. The cam plate 59 has a portion thereof forked to form a notch 63, in which a stud 65 provided on the operating lever 23 for the suction port throttle valve is received. When the acceleration lever 30 is rotated in the direction of the arrow, the stud 55 only slides in the cam groove 61 in the cam plate 59 and said cam plate therefore will not rotate until the rotational angle of the acceleration lever reaches a certain value. As the acceleration lever 30 is further rotated, the cam plate 59 is caused to rotate by the stud 55 to the position indicated at 59'. Upon reaching his position, the cam plate will not rotate even when the acceleration lever 30 continues its rotation in the direction of the arrow, because in this position of the cam plate, the stud 55 only slides in the cam groove 61. During the rotation of the cam plate 59, the stud 65 on the operating lever 23 of the suction port throttle valve is moved by the notch 63 in the cam plate and, therefore, the suction port throttle valve is opened or closed by the rotation of the cam plate 59.

As described hereinabove, the device shown in FIG. 5 enables the relative operation of the respective elements as shown in FIG. 4 to be carried out.

Figure 6:
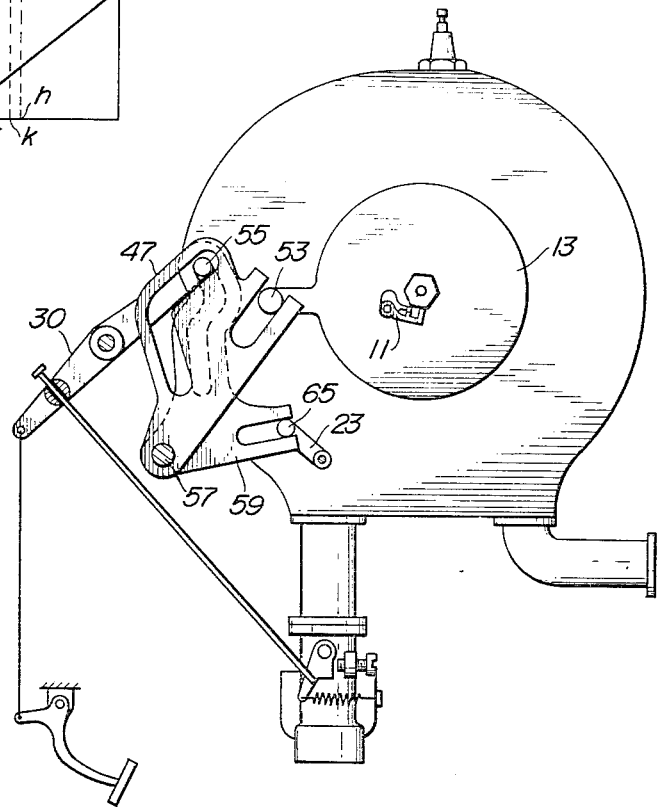

FIG. 6 shows another embodiment, in which the cam plates 47 and 59 shown in FIG. 4, which control the operations of the mounting base of the contact breaker and the suction port throttle valve respectively, are pivotally mounted on a common pivot pin 57 in superposed relation and are operated by a single stud 55. This device operates on the same principle as that of the device shown

We claim:
1. A spark ignition-type rotary piston engine composed of a central housing, side covers closing both sides of said housing, a rotary shaft extending through the center of said housing and said side covers, and a rotor mounted on said rotary shaft for rotation within said housing and provided at each apex with a sealing member adapted to slide on the inner surface of said housing, said rotary piston engine being characterized by comprising a throttle valve provided in the vicinity of the suction port; an ignition system; a carburetor with a throttle valve provided therein; operating levers connected to said suction port throttle valve, ignition system and carburetor throttle valve; and means for correlatively connecting said operating levers with each other, whereby misfiring of the engine during operation at low r.p.m. is avoided, and a large output during operation at high r.p.m. is achieved.

2. A spark ignition-type rotary piston engine composed of a central housing, side covers closing both sides of said housing, a rotary shaft extending through the center of said housing and said side covers, and a rotor mounted on said rotary shaft for rotation within said housing and provided at each apex with a sealing member adapted to slide on the inner surface of said housing, said rotary piston engine being characterized by comprising a throttle valve provided in the vicinity of the suction port; an ignition system; a carburetor with a throttle valve provided therein; operating levers connected to said suction port throttle valve, ignition system and carburetor throttle valve; an acceleration lever carrying thereon three studs; two cam plates each having a cam groove formed therein for receiving the corresponding stud, and having a portion thereof forked for engaging a cooperating pin carried by the corresponding operating lever connected to either the suction port throttle valve or the ignition system, and a link connecting the operating lever of the carburetor throttle valve with the remaining stud on the acceleration lever.

3. A spark ignition-type rotary piston engine composed of a central housing, side covers closing both sides of said housing, a rotary shaft extending through the center of said housing and said side covers, and a rotor mounted on said rotary shaft for rotation within said housing and provided at each apex with a sealing member adapted to slide on the inner surface of said housing, said rotary piston engine being characterized by comprising a throttle valve provided in the vicinity of the suction port; an ignition system; a carburetor with a throttle valve provided therein; operating levers connected to said suction port throttle valve, ignition system and carburetor throttle valve; an acceleration lever carrying thereon two studs; two cam plates having cam grooves formed therein for receiving commonly one of the studs, and mounted on a common pivot pin for pivotal movement thereabout, each of said cam plates having a forked portion for engagement with a cooperating pin carried by the corresponding operating lever connected to either the suction port throttle valve or the ignition system; and a link connecting the operating lever of said carburetor throttle valve with another stud on the acceleration lever.

References Cited

UNITED STATES PATENTS

| | | |
|---|---|---|
| 2,302,254 | 11/1942 | Rhine. |
| 3,140,700 | 7/1964 | Nallinger. |
| 3,196,846 | 7/1965 | Ohlendorf. |

C. J. HUSAR, Primary Examiner